Patented Nov. 21, 1939

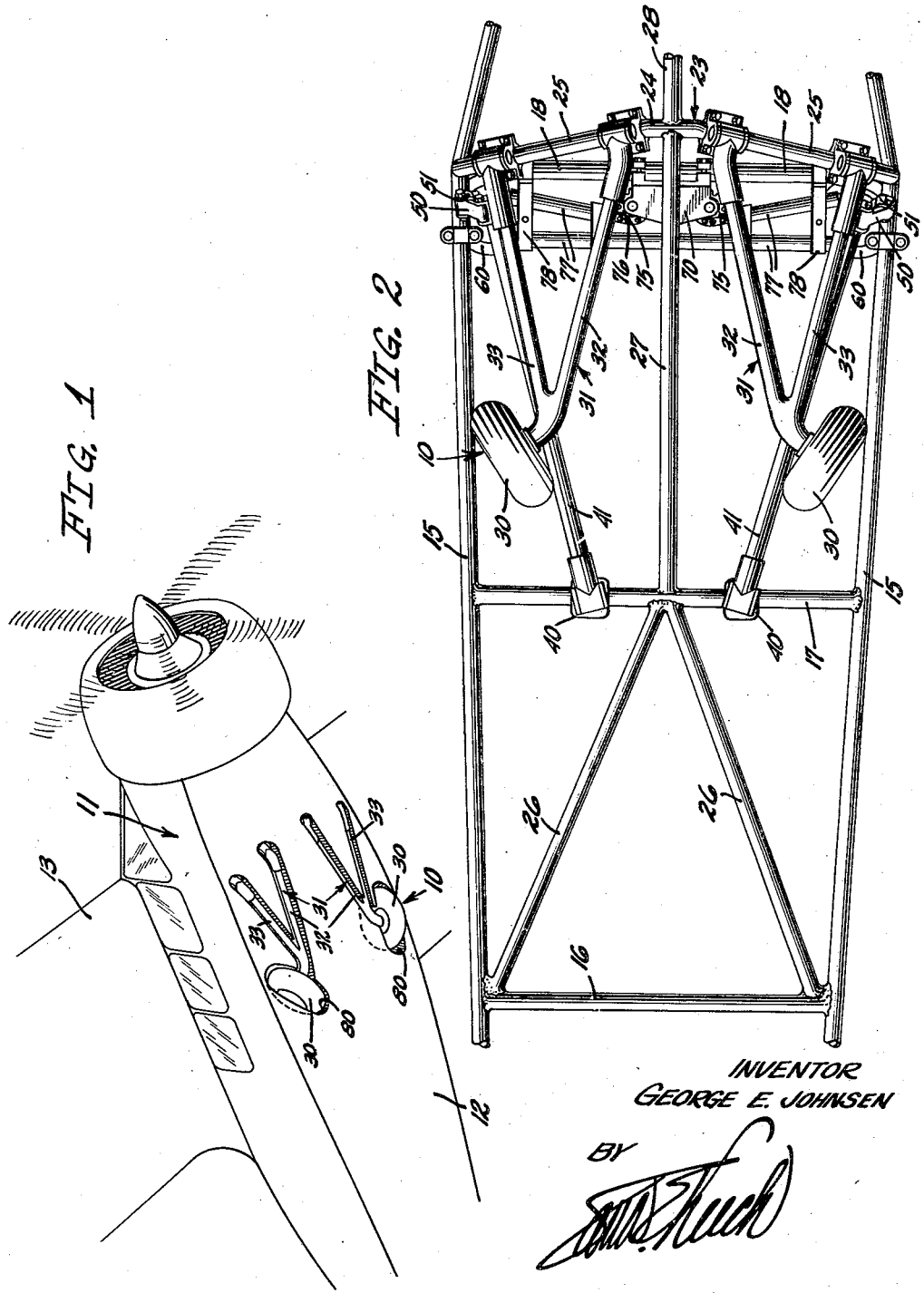

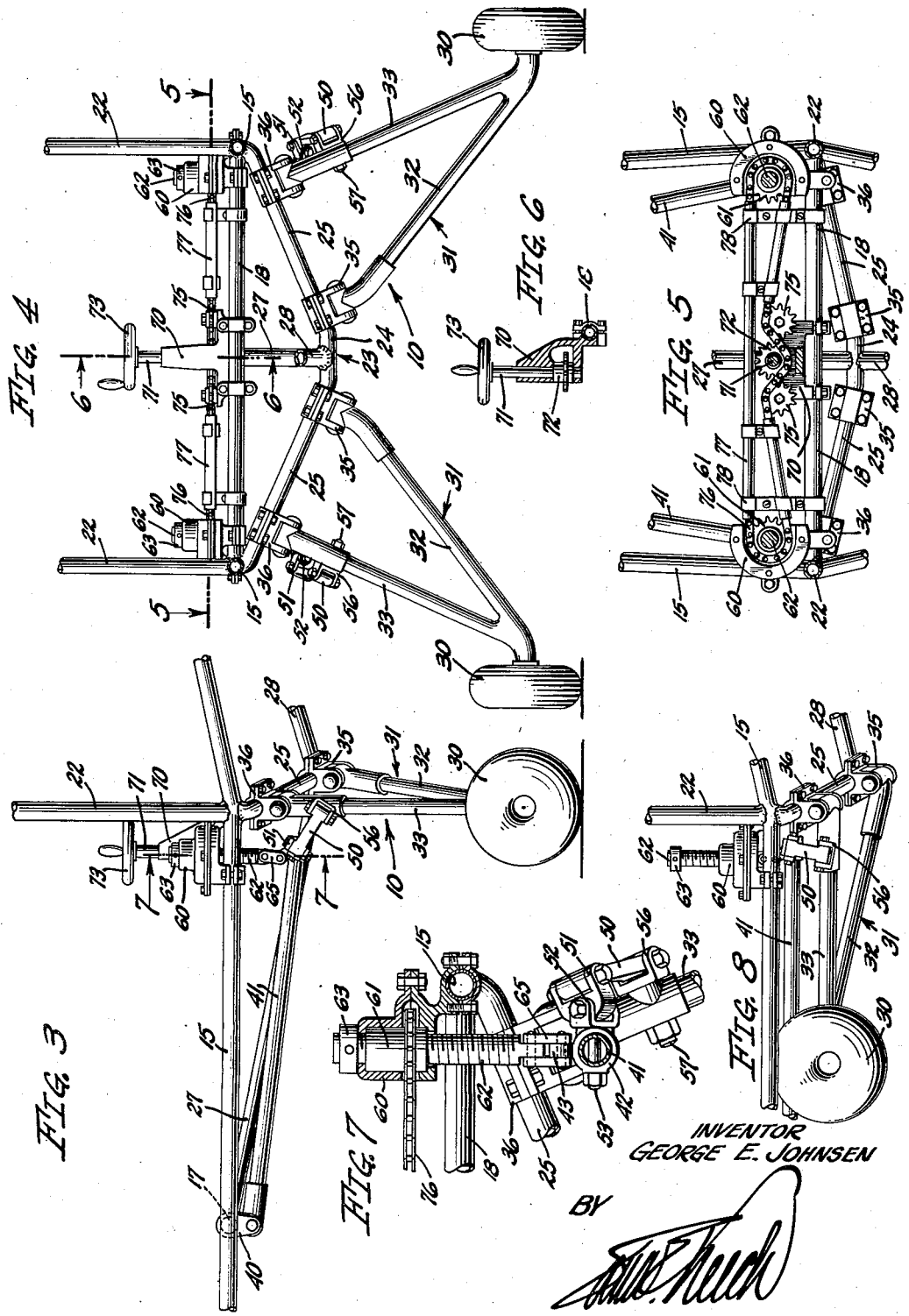

2,180,526

UNITED STATES PATENT OFFICE 2,180,526

RETRACTABLE LANDING GEAR

George E. Johnsen, Phoenix, Ariz.

Application January 25, 1938, Serial No. 186,845

2 Claims. (Cl. 244—102)

This invention relates to aircraft and more particularly to an improved retractable landing gear therefor.

While the advantages of retractable landing gears have been generally recognized, the types of such landing gears provided to date lack adaptability to certain types of ships which are very popular with the flying public. The type of ship just mentioned is the high wing cabin monoplane or the bi-plane in which there is neither room for accommodation of the retractable landing gear in a lower wing or in the fuselage adjacent the mounting of the landing gear.

It is an object of my invention to provide a retractable landing gear for aircraft which is especially suitable for high wing monoplanes and cabin bi-planes.

It is a further object of my invention to provide a retractable landing gear suitable for use with a wide variety of aircraft.

It is a still further object of my invention to provide a retractable landing gear which is capable of use for assisting the aircraft equipped therewith in taking off.

The manner of accomplishing the foregoing objects, as well as further objects and advantages will be made manifest in the following description taken in connection with the accompanying drawings in which:

Fig. 1 is a fragmentary perspective view of a high wing monoplane equipped with a preferred embodiment of the retractable landing gear of my invention.

Fig. 2 is an enlarged bottom plan view of the structure of the landing gear shown in Fig. 1, with the fuselage covering removed.

Fig. 3 is a side elevational view of the landing gear structure shown in Fig. 2, with the wheels extended in position for landing.

Fig. 4 is the front elevational view with the landing gear down as shown in Fig. 3.

Fig. 5 is a diagrammatic horizontal sectional view taken on the line 5—5 of Fig. 4.

Fig. 6 is a detailed vertical view taken on the line 6—6 of Fig. 4.

Fig. 7 is an enlarged detail fragmentary sectional view taken on the line 7—7 of Fig. 3.

Fig. 8 is a fragmentary view similar to Fig. 3 showing the wheels retracted.

Referring specifically to the drawings, it is noted that I have shown a retractable landing gear 10 comprising a preferred embodiment of my invention and which is incorporated in an airplane 11 of the high wing cabin monoplane type. The airplane 11 has a fuselage 12 on which is constructed a wing 13 for sustaining the airplane in flight. The fuselage 12 includes lower longérons 15 which are preferably made of metal tubing and cross-members 16, 17 and 18 connecting these longérons, (see Fig. 2). Continuing forwardly beyond the vertical plane of the cross-member 18, the longérons 15 incline inwardly as shown in Figs. 2, 3 and 8, to form longérons of the nose portion of the fuselage. Extending upwardly from the longérons 15 in this vertical plane are vertical fuselage frame struts 22.

At the points where cross-member 18 and struts 22 are welded to the lower longérons 15, opposite ends of a landing gear yoke 23 are also welded thereto. This yoke is in the shape of a very flat V including a central portion 24 and inclined side portions 25. The yoke 23 is preferably inclined forwardly from the vertical plane of the upright struts, (see Figs. 2, 3, 5 and 8).

Bracing the cross bar 17 at its middle are brace bars 26. Extending forwardly from cross bar 17 and connecting with the central portion 24 of the yoke 23 is a brace bar 27. Extending forwardly and upwardly from the center portion 24 of the yoke 23 is a tubular bar 28 which forms a portion of the frame work of the nose of the fuselage 12.

The landing gear 10 includes a pair of landing wheels 30 supported at the lower end of leg structures 31, each of the latter including legs 32 and 33 which are reinforced at their upper ends and pivotally suspended from yoke clamps 35 and 36 which are securely clamped onto the inclined portions 25 of the landing gear yoke 23. The upper end of the legs 32 and 33 may be preferably reinforced as shown in the drawings. Provided on the cross bar 17 and extending downward therefrom are pivot brackets 40 in which are pivotally mounted the rear ends of torque bars 41 which are preferably formed of tubing. The front ends of the torque bars 41 have head fittings 42 on each of which is formed an ear 43.

Connecting the head 42 of each torque bar 41 to an upper portion of each of the adjacent leg 33 is a universal link 50. The upper end of the link 50 connects to the torque bar head 42 through a yoke 51, a yoke 52 and a shank 53 provided on the latter, said shank extending through the head 42 so as to pivotally mount the yoke 52 thereon. As shown in Fig. 7, the yoke 51 is pivoted on the link 50 and the yoke 52 is pivoted on the yoke 51 thus making a universal connection between the link 50 and the torque bar head 42. The lower end of each link 50 is connected to the adjacent leg 33, some distance downward from the upper end of the latter, through a yoke 56, which is pivoted on the lower end of link 50, and a shank 57 which is provided on the yoke 56 and which extends through a suitable hole in the leg 33 and is secured therein so as to provide a pivotal connection between the yoke 56 and this leg.

Clamped upon the longérons 15 and cross bar 18 in the rear inner angle between these are nut sprocket housings 60 in which nut sprockets 61 are journalled to rotate about vertical axis. Screwed upwardly through the nut sprockets 61 are screw shafts 62 having collars 63 on their upper ends and having their lower ends pivotally connected through links 65 with the ears 43 of the torque bar head fittings 42 which are disposed just below the screw shafts 62.

Mounted on the cross bar 18 is a drive sprocket housing 70 which embodies bearing means in which a shaft 71 is journalled, this shaft carrying a drive sprocket 72. The housing 70 also provides means for supporting idle sprockets 75 which lie in the same horizontal plane as the drive sprocket 72. This plane is the same as that in which the sprocket teeth of the nut sprockets 61 rotate and the nut sprockets 61 and the sprockets 72 and 75 are all connected by an endless chain 76 which is trained about these sprockets as shown in Fig. 5. Exposed portions of the chain 76 are guarded as by tubes 77 mounted on brackets 78 which are supported on the fuselage cross bar 18. Provided on the upper end of the shaft 71 is a hand wheel 73 which is preferably placed in a position accessible to the pilot of the airplane. It is to be understood that the retractable landing gear 10 of my invention is diagrammatically illustrated in the drawings and while this is shown as operable by manual control means this is merely an illustrative disclosure and the invention may be operated by any kind of power device suitable for use in airplanes.

The landing gear 10 normally remains as in Figs. 3 and 4, while the airplane 11 is on the ground. Just before preparing to take off, the pilot may manipulate the hand wheel 72 so as to rotate the sprocket nuts 61 and lift the screw shafts 62 upwardly slightly, this movement being carried out just sufficiently to draw the wheels 30 rearwardly so as to be substantially under the center of gravity of the plane. While this action is not necessary in using the landing gear 10, it constitutes a distinctive advantage of this landing gear as it makes possible the lifting of the tail of the plane after a relatively short run, thereby decreasing the air resistance to obtaining flying speed and substantially reducing the length of time required for the take off.

Whether the wheels 30 are allowed to remain in their forwardmost position as shown in Fig. 3 or whether they are moved slightly backward just prior to the take off, as soon as the airplane is in the air, the wheels are retracted entirely upwardly by a rapid rotation of the hand wheel 72 by the pilot. The rotation of the hand wheel 72 will, of course, be transmitted through the chain 76 to the sprocket nuts 61 causing the latter to rotate and draw upwardly on the screw shafts 62. This motion is continued until the wheels 30 are retracted upwardly as shown in Figs. 1, 2 and 8.

As the leg structures 31 and wheels 30 are retracted upwardly, they fit into suitable pockets 80 provided in the skin structure of the fuselage. When thus retracted, the landing gear 10 presents a very small head resistance as compared with the head resistance of the landing gear when it is down.

When the landing gear of my invention is installed in the cabin planes such as the airplane 11, the pockets 80 for the wheels 30 may easily be designed to lie beneath a seat for passengers in the plane so that these pockets do not interfere in any way with the accommodations within the plane.

What I claim is:

1. In an airplane, a retractable landing gear comprising: a landing wheel; a leg structure on one end of which said wheel is mounted; means for pivotally mounting the other end of said leg structure on said airplane on a biased axis inclined inwardly and downwardly relative to the transverse axis of said airplane, the inclination of said axis rendering said structure swingable to shift said wheel from a rearwardly, upwardly and centrally located retracted position and a forwardly, downwardly and laterally outwardly disposed extended position; and mechanism for effecting the movement of said structure and said wheel between said two positions.

2. In an airplane, a retractable landing gear comprising: a landing wheel; a leg structure on one end of which said wheel is mounted; means for pivotally mounting the other end of said leg structure on said airplane on a biased axis inclined inwardly and downwardly and forwardly relative to the transverse axis of said airplane, the inclination of said axis rendering said structure swingable to shift said wheel from a rearwardly, upwardly and centrally located retracted position and a forwardly, downwardly and laterally outwardly disposed extended position; and mechanism for effecting the movement of said structure and said wheel between said two positions.

GEORGE E. JOHNSEN.